(12) United States Patent
Tsuruta et al.

(10) Patent No.: US 7,690,661 B2
(45) Date of Patent: Apr. 6, 2010

(54) SUSPENSION STRUCTURE WITH IMPROVED SHOCK ABSORBER ARRANGEMENT, AND VEHICLE INCORPORATING SAME

(75) Inventors: Yuichiro Tsuruta, Saitama (JP); Takashi Shichinohe, Saitama (JP); Masahiro Yamaguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 132 days.

(21) Appl. No.: 11/699,769

(22) Filed: Jan. 30, 2007

(65) Prior Publication Data

US 2007/0176387 A1 Aug. 2, 2007

(30) Foreign Application Priority Data

Jan. 31, 2006 (JP) ............................. 2006-022882
Nov. 15, 2006 (JP) ............................. 2006-308832

(51) Int. Cl.
*B60G 3/20* (2006.01)
(52) U.S. Cl. ..................... 280/124.135; 280/124.134; 280/124.136; 280/124.138; 280/124.141; 280/124.143; 180/348; 180/908
(58) Field of Classification Search .......... 280/124.109, 280/124.134–124.136, 124.145, 124.141, 280/124.143, 124.146, 124.154; 180/348, 180/908
See application file for complete search history.

(56) References Cited

U.S. PATENT DOCUMENTS

| 4,615,538 | A | * | 10/1986 | Solleder | 280/124.125 |
|---|---|---|---|---|---|
| 4,721,326 | A | * | 1/1988 | Massos et al. | 280/124.134 |
| 4,786,075 | A | * | 11/1988 | Takahashi | 180/254 |
| 5,074,581 | A | * | 12/1991 | Matsuoka | 280/124.13 |
| 5,286,052 | A | * | 2/1994 | Lukianov | 280/124.134 |
| 5,348,337 | A | * | 9/1994 | Ando | 280/124.143 |
| 6,412,797 | B1 | | 7/2002 | Park | |
| 6,431,569 | B2 | * | 8/2002 | Handa | 280/124.138 |
| 6,695,329 | B2 | | 2/2004 | Handa | |
| 6,746,032 | B2 | * | 6/2004 | Seki | 280/124.135 |
| 6,827,361 | B2 | * | 12/2004 | Seki | 280/124.134 |
| 7,398,982 | B2 | | 7/2008 | Hozumi | |
| 2005/0253353 | A1 | * | 11/2005 | Yamamura et al. | 280/124.135 |
| 2007/0176407 | A1 | * | 8/2007 | Tsuruta et al. | 280/788 |

FOREIGN PATENT DOCUMENTS

| CN | 1680161 | 10/2005 |
|---|---|---|
| JP | 2001-328410 | 11/2001 |

* cited by examiner

*Primary Examiner*—Paul N Dickson
*Assistant Examiner*—James English
(74) *Attorney, Agent, or Firm*—Carrier, Blackman & Associates, P.C.; William D. Blackman; Joseph P. Carrier

(57) ABSTRACT

A suspension structure is configured to ensure a large stroke of a shock absorber in a suspension device without moving an upper end supporting position of a damper upward relative to a conventional mounting position. The suspension structure includes a rear suspension for suspending left and right rear wheels. The rear suspension includes left and right lower arms for supporting the left and right rear wheels by way of knuckles, and left and right rear shock absorbers interposed between the respective lower arms and a sub-frame of a vehicle body frame. A lower end connecting portion of the rear shock absorber is cantilevered to a front side of the lower arm.

15 Claims, 10 Drawing Sheets

SUSPENSION STRUCTURE WITH IMPROVED SHOCK ABSORBER ARRANGEMENT, AND VEHICLE INCORPORATING SAME

CROSS-REFERENCE TO RELATED APPLICATIONS

The present invention claims priority under 35 USC 119 based on Japanese patent application Nos. 2006-022882, filed on Jan. 31, 2006 and 2006-308832, filed on Nov. 15, 2006. The subject matter of these priority documents is incorporated by reference herein.

BACKGROUND OF THE INVENTION

1. Field of the Invention

The present invention relates to a suspension structure for a vehicle provided with wheels on the left and right sides of a vehicle body, such as an all-terrain vehicle (ATV).

2. Description of the Background Art

In the related art, in the suspension of an ATV, there is a known structure in which left and right rear wheels are respectively supported by suspension arms by way of knuckles, and dampers are interposed between the suspension arms and a rear portion of a vehicle body frame. Such a suspension structure is disclosed, for example, in JP-A-2001-328410. A rear terminal gear case is arranged in the rear portion of the vehicle body frame, and the left and right rear wheels are driven by way of power transmission shafts extending from the rear terminal gear case to both the left and right, respectively. An upper end portion of the damper is supported by the vehicle body frame, and a lower end portion of the damper is connected to the inside of the suspension arms in the longitudinal direction.

In the related art shown above, since the lower end portion of the damper is located inside the suspension arms in the longitudinal direction, the layout of the lower end portion is apt to be limited, due to the relation between the knuckle and the power transmission shaft. Therefore, in order to ensure a shock absorber stroke required for traveling, it is considered that the upper end supporting position (position supported by the vehicle body) of the damper is moved further upward (inside the vehicle body frame).

However, when the upper end supporting position of the damper is moved upward, the possibilities for the layout of a passenger's seat or vehicle body components such as a fuel tank, a carrier, an air cleaner case and a muffler may be restrained and hence, improvement in this point is desired.

Therefore, the invention provides a suspension structure in which a large shock absorber stroke of a suspension device can be ensured without moving the vehicle body supporting position of the damper to the inside of the vehicle body frame.

SUMMARY

In order to solve the above-mentioned drawback, an inventive suspension system is provided. A first aspect of the invention is directed to a suspension structure in which a suspension device (for example, a rear suspensions 75 in an embodiment) for suspending left and right rear wheels (for example, left and right rear wheels 3 in the embodiment) includes a suspension arm (for example, lower arms 77, 177 in the embodiment) for supporting the wheel by way of a knuckle (for example, a knuckle 78 in the embodiment), and a damper (for example, a rear shock absorber 79 in the embodiment) interposed between the suspension arm and a vehicle body frame (for example, a sub-frame 60 in the embodiment). The suspension device further includes a power transmission shaft for transmitting a power to the wheel (for example, a rear drive shaft 16 in the embodiment). The first aspect of the invention is characterized in that a connecting portion of the damper for connecting the damper to the suspension arm (for example, a lower end connecting boss 79*b* in the embodiment) is cantilevered from the suspension arm.

According to the first aspect of the invention, since the connecting portion, or lower end portion, of the damper is cantilevered, mounting flexibility above the suspension arm is increased and hence, the arrangement permitting an increased shock absorber stroke is possible.

A second aspect of the invention is characterized in that the connecting portion of the damper is connected to the outside of the suspension arm.

According to the second aspect of the invention, since the connecting portion, or lower end portion, of the damper is disposed on the outside of the suspension arm, the damper can be arranged without being affected by the arrangement of the vehicle body components arranged inside the suspension arm. Such vehicle body components include, for example, a power transmission shaft or the like. As a result, the shock absorber stroke can be increased, and the damper can be mounted and demounted easily from the outside of the suspension arm. Therefore, ease of assembly and the maintainability of the damper can be improved. The damper is positioned in the vicinity of the center of the vehicle body by connecting the connecting portion of the damper to the front-surface side of the suspension arm and hence, the mass of the vehicle body can be concentrated.

A third aspect of the invention is characterized in that the connecting portion of the damper is arranged in the vicinity of the knuckle.

According to the third aspect of the invention, since a long distance can be ensured in the widthwise direction of the vehicle body by arranging the connecting portion of the damper in the vicinity of the knuckle, a large shock absorber stroke of the suspension device can be ensured without moving the upper end supporting position of the damper upward, for example to a location inside the vehicle body frame.

A fourth aspect of the invention is characterized in that the suspension arm includes two integrally assembled arm bodies (for example, front and rear arm bodies 83*a*, 83*b* in the embodiment), and the connecting portion of the damper is supported by a supporting portion penetrating the two arm bodies (for example, lower supporting pipes 85, 185 in the embodiment).

According to the fourth aspect of the invention, the supporting rigidity of the lower end portion of the damper can be increased to increase the rigidity of the suspension device.

A fifth aspect of the invention is characterized in that the damper is superimposed with the suspension arm in the direction of the height thereof.

According to the fifth aspect of the invention, since the damper is provided so as to be overlapped with the suspension arm in the direction of height, the damper can be arranged at a distance also in the direction of height and hence, a large shock absorber stroke can be ensured.

A sixth aspect of the invention is characterized in that a stud shaft (for example, a stud shaft 190 in the embodiment) which supports the connecting portion of the damper is fixedly mounted on the supporting portion.

According to the sixth aspect of the invention, the damper and the suspension arm can be easily assembled to each other and the supporting rigidity of the lower end portion of the damper can be increased compared to a case that the connecting portion of the damper is supported using a connecting shaft such as a bolt which is formed as a separate member.

A seventh aspect of the invention is characterized in that the connecting portion of the damper is supported on the supporting portion by way of a connecting shaft (for example, a connecting shaft 90 in the embodiment) which penetrates the supporting portion in the axial direction thereof.

According to the seventh aspect of the invention, since a cantilever load of the connecting portion of the damper can be supported on the whole supporting portion, the supporting rigidity of the lower end portion of the damper can be further increased.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

Figure 1:
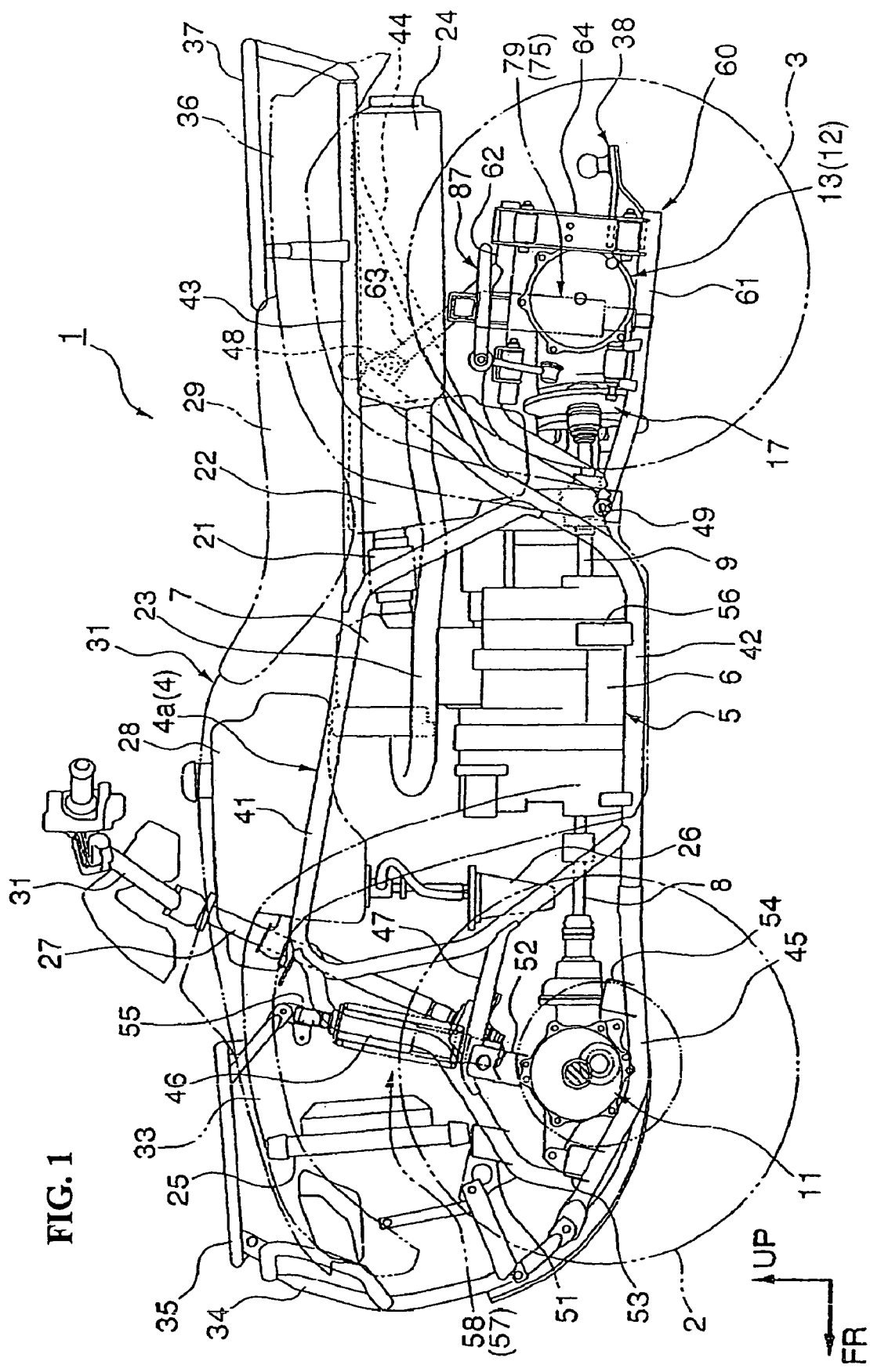
FIG. 1 is a side plan view of a saddle-type four-wheel all-terrain vehicle, with selected body components shown in phantom in order to show frame components more clearly, the vehicle incorporating a suspension structure according to an embodiment of the present invention.

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

In the drawings and in the description given below, directions of front, rear, left and right correspond to the directions considered from the vantage point of a driver seated in the vehicle, unless otherwise specified. An arrow FR in the drawing represents the front of the vehicle, an arrow LH represents the left of the vehicle, and an arrow UP represents the upper direction of the vehicle.

Figure 2:
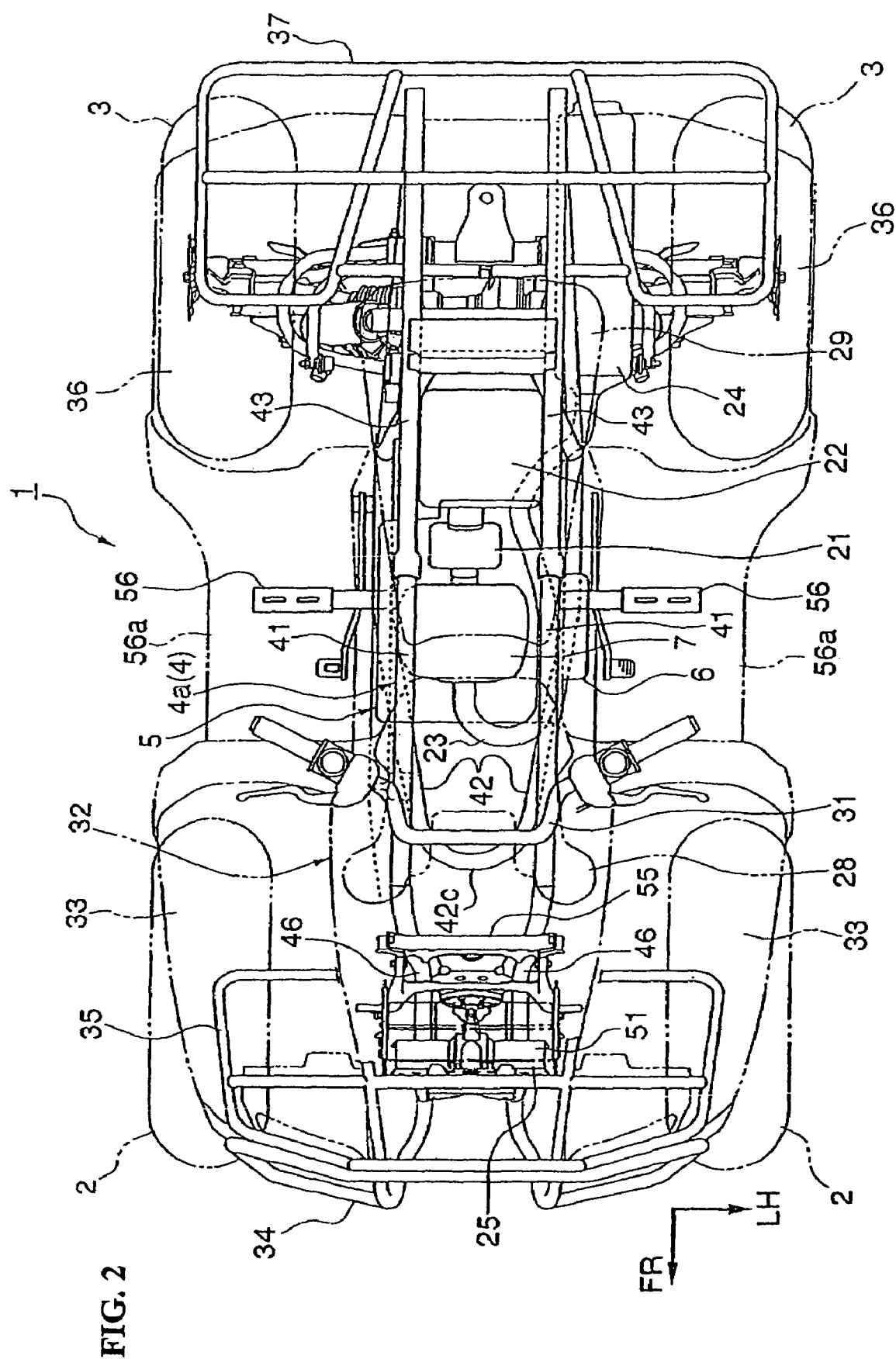
FIG. 2 is a top plan view of a the saddle type four-wheel vehicle of FIG. 1, with selected body components shown in phantom in order to show frame components more clearly.

Referring now to FIGS. 1-2, a first embodiment of the invention will now be described, with respect to a saddle-type four-wheel all-terrain vehicle 1 (commonly referred to as an ATV), designed for operation on rough terrain. The vehicle 1 includes left and right front wheels 2 and rear wheels 3. The wheels 2, 3 are provided with low-pressure balloon tires, of relatively large diameter, located at the front and rear of the vehicle body, respectively. The vehicle body is configured to be compact and light in weight, and has a large minimum ground clearance for enhancing traveling performance mainly on the rough terrain. A vehicle body frame 4 of this saddle-type four-wheel all-terrain vehicle 1 includes a separate sub-frame 60 (FIGS. 1, 4) integrally connected to the rear portion of a frame body 4a.

Both of the front wheels 2 are suspended by way of front suspensions 57. The front suspensions 57 are of an independent suspending type (double wishbone type). Both of the rear wheels 3 are suspended at the rear portion (sub-frame 60) of the vehicle body frame 4 by way of rear suspensions 75 of the same independent suspending type (double wishbone type) at the rear of the vehicle body frame 4 (frame body 4a).

An engine 5 is provided as a drive motor of the saddle-type four-wheel all-terrain vehicle 1, and is mounted to a substantially central portion of the vehicle body frame 4. The engine 5 is, for example, a water-cooled single-cylinder engine. In the depicted example, the engine 5 is arranged in a so-called vertical layout, with the axis of rotation of a crankshaft oriented to extend along the longitudinal direction of the vehicle. A crankcase 6, which constitutes a lower portion of the engine 5, also serves as a transmission case, and front and rear propeller shafts 8, 9 extend outwardly from the front and rear of the crankcase 6 toward the front and the rear, respectively.

The respective propeller shafts 8, 9 are connected to both of the front wheels 2 or both of the rear wheels 3 by way of front and rear terminal gear cases 11, 12 or the like, so as to be capable of transmitting power to the front lower side or the rear lower side of the vehicle body frame 4. The rotary power, or torque, from the engine 5 is transferred to the respective propeller shafts 8, 9 by way of a transmission (not shown in the drawing) stored in the crankcase 6, and the torque is then transmitted to the front wheels 2 and rear wheels 3 by way of the respective terminal gear cases 11, 12, left and right drive shafts, and related drive train components.

As shown in FIGS. 1-2, in the engine 5, a throttle body 21 is connected to the rear intake portion of a cylinder 7, which extends upright on the crankcase 6. An air cleaner case 22 is connected to the rear portion of the throttle body 21. In addition, the proximal end portion of an exhaust pipe 23 is connected to the front portion of the cylinder 7. The exhaust pipe 23 extends forwardly of the cylinder 7, then reverses direction to extend backward along the left side of the cylinder 7, and is then connected at the distal end thereof to a muffler 24 on the left side on the rear portion of the vehicle body. Reference numeral 26 in FIG. 1 designates a fuel pump for pressure-feeding fuel to a fuel injector on the throttle body 21.

In a widthwise central upper vehicle body portion of the saddle-type four-wheel all-terrain vehicle 1, there are provided, in order from the front, a steering shaft 27, a fuel tank 28 and a saddle-type seat 29 respectively. A handlebar 31 is positioned at an obliquely upper front position of the fuel tank 28, and is mounted to the upper end portion of the steering shaft, 27 to permit manual steering operation of the front wheels 2 by a driver. A front wheel steering mechanism, not shown in the drawing, is connected to the lower end portion of the steering shaft 27. A radiator 25, for cooling liquid coolant from the engine 5, is disposed at a lower front portion of the steering shaft 27.

A vehicle body cover 32 is formed of a resilient plastic resin, and covers the front portion of the vehicle body as needed. A front fender 33, also formed of resin, covers both of the front wheels 2 on both an upper and rear side thereof. In addition, a front protector 34 and a front luggage carrier 35, formed mainly of steel material, are mounted to the front portion of the vehicle body frame 4. A rear fender 36 is formed of resin and covers both of the rear wheels 3 on both an upper and front side thereof, and a rear luggage carrier 37, formed mainly of steel material, is mounted to the rear portion of the vehicle body frame 4, along with the rear fender 36. A mounting bracket 38*a*, extending rearwardly, and a trailer hitch 38, mainly including a hitch ball 38*b* which is supported thereby, are mounted to a lower rear end portion of the vehicle body frame 4.

Figure 3:
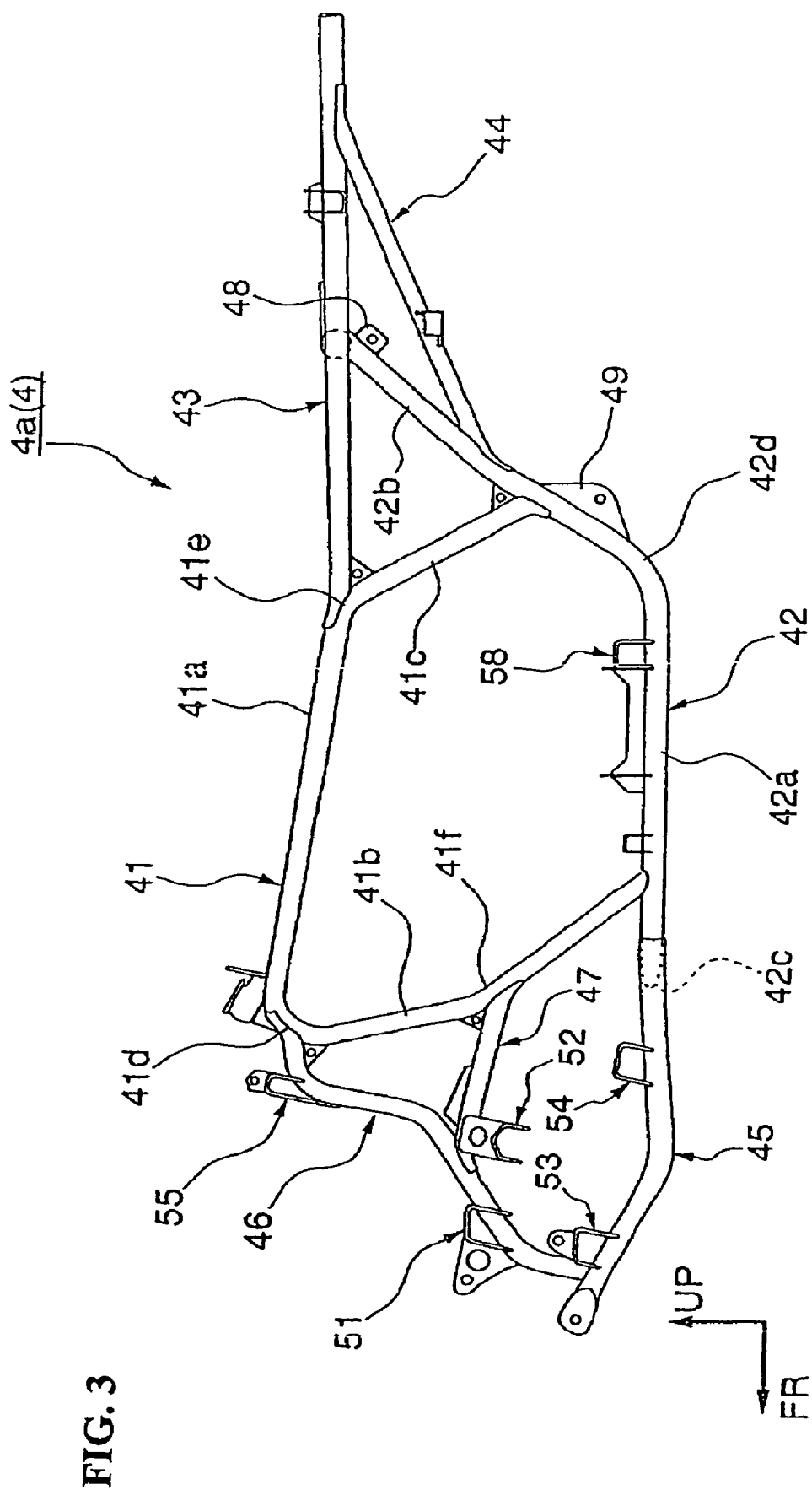
FIG. 3 is a side plan view of a frame body portion of a vehicle body frame of the saddle-type four-wheel all-terrain vehicle of FIGS. 1-2.

Referring also to FIG. 3, the frame body 4*a* of the vehicle body frame 4 is formed of a plurality of tubular steel members, integrally joined together by welding or the like. To be more specific, the vehicle body frame 4 includes a pair of left and right closed loop structures (only a left side of these structures is shown in FIG. 3, with the right side being substantially similar) including mainly left and right upper pipes 41 and lower pipes 42. The frame body 4*a* of the vehicle body frame 4 is formed by joining these members 41, 42 with a plurality of crossmembers and other related components into a generally box-shaped cage structure, extending in the longitudinal direction at the widthwise central portion of the vehicle. Hereinafter, the left side of the vehicle body frame 4 shown in FIG. 3 will be described unless otherwise specified, and the description on the right side of the vehicle body frame 4 will be omitted, since it is substantially symmetrical to the left side.

The upper pipe 41 is integrally formed by bending a single steel pipe, and includes an upper inclined portion 41*a* arranged obliquely so as to extend slightly downward toward the rear on the outside of the upper portion of the vehicle body frame 4. The upper pipe 41 also includes a front inclined portion 41*b* extending downwardly and obliquely rearwardly from the front end portion of the upper inclined portion 41*a* and disposed at an acute angle thereto. The upper pipe 41 also includes a rear inclined portion 41*c* extending obliquely rearwardly and downwardly from the rear end portion of the upper inclined portion 41*a*, and disposed at an obtuse angle thereto. A front bent portion 41*d* is formed between the upper inclined portion 41*a* and the front inclined portion 41*b* of the upper pipe 41, a rear bent portion 41*e* is formed between the upper inclined portion 41*a* and the rear inclined portion 41*c*, and an intermediate bent portion 41*f*, which is a protrusion extending toward the front, is formed at a substantially central portion of the front inclined portion 41*b*.

In addition, the lower pipe 42 is integrally formed by bending a single steel pipe, and includes a lower horizontal portion 42*a* which extends substantially in a longitudinal horizontal direction on the outside of the lower portion of the vehicle body frame 4. The lower pipe 42*a* also includes a rear inclined portion 42*b* extending obliquely upwardly and rearwardly at an obtuse angle from the rear end portion of the lower horizontal portion 42*a*. The left and right lower pipes 42 are connected continuously at the front end portions thereof (the front end portion of the lower horizontal portion 42*a*) by way of an arcuate portion 42*c* (see FIG. 2) protruding toward the front in top view, and provided so as to form an integral structural body with the left and right lower pipes 42. A lower bent portion 42*d* is formed between the lower horizontal portion 42*a* and the rear inclined portion 42*b* of the lower pipe 42.

The lower end portion of the front inclined portion 41*b* of the upper pipe 41 is joined to the lower horizontal portion 42*a* of the lower pipe 42 at a medial front end portion thereof, as shown. The lower end portion of the rear inclined portion 41*c* of the upper pipe 41 is joined to the rear inclined portion 42*b* of the lower pipe 42 at a vertically intermediate portion thereof. A lower frame bracket 49 is provided on the lower pipe 42 immediately above the lower bent portion 42*d* thereof, and a lower frame-connecting boss 65 (FIGS. 4, 7) of the sub-frame 60 is connected to the lower frame bracket 49.

The front end portion of a rear upper pipe 43 provides a seat rail arranged substantially in the horizontal direction, and is joined to the rear bent portion 41*e* of the upper pipe 41. The upper end portion of the rear inclined portion 42*b* of the lower pipe 42 is joined to the longitudinally intermediate portion of the rear upper pipe 43. A rear sub pipe 44 inclining upward toward the rear is extended between the vertically intermediate portion of the rear inclined portion 42*b* of the lower pipe 42 and the rear end portion of the rear upper pipe 43. An upper frame bracket 48 is provided, proximate the upper end of the rear inclined portion 42*b* of the lower pipe 42, and the upper frame bracket 48 is supportively connected to an upper frame connecting portion 66*a* of the sub-frame 60.

The rear end portion of a front lower pipe 45, arranged substantially in the horizontal direction, is joined to the front end portion of the lower horizontal portion 42*a* of the lower pipe 42. The front portion of the front lower pipe 45 is curved toward the obliquely upper front thereof, and the lower end portion of the front protector 34 is connected to the front end portion thereof. The front protector 34 serves also as a foundation pipe for supporting the front carrier 35 thereon. The lower horizontal portion 42*a* of the lower pipe 42 is provided with a step bar 56 thereon, and the step bar 56 and a step board 56*a* constitute a rider's step.

The upper end portion of a front shock absorber mounting pipe 46, extending from the front bent portion 41*d* of the upper pipe 41 near the front end portion of the front lower pipe 45, is connected to the front bent portion 41*d*. The front shock absorber mounting pipe 46 is bent into a gradual crank shape as viewed in a side view, and the lower end portion thereof is joined to the front end portion of the front lower pipe 45. A front reinforcing pipe 47, inclined slightly upward toward the front, is extended between the vertically intermediate portion of the front shock absorber mounting pipe 46 and the intermediate bent portion 41*f* of the upper pipe 41.

Here, a laterally extending intermediate front crossmember 51 and an upper crossmember 55 are extended between the left and right front shock absorber mounting pipes 46, respectively. In the same manner, a lower front crossmember 53 and a lower medial crossmember 54 are extended between the left and right front lower pipes 45, and an intermediate crossmember 52 extends between the left and right front sub pipes 47.

The front and rear proximal ends of the left and right upper arms (not shown in the drawing) of a front suspension 57 are supported at both side portions of the intermediate front and rear crossmembers 51, 52, so as to be capable of pivotally and reciprocally swinging in the vertical direction. The front and rear proximal end sides of the left and right lower arms of the front suspension (not shown in the drawing) are, respectively, pivotally supported at both side portions of the lower front and rear crossmembers 53, 54, so as to be capable of swinging in the vertical direction. The upper and lower ends of the left and right knuckles (not shown in the drawing) are supported at the distal end sides of both upper arms and the lower arms so as to be capable of swinging in the vertical direction, and hub portions of the left and right front wheels 2 are rotatably supported by both knuckles. Left and right front shock absorbers 58 (also called dampers herein) are interposed between both lower arms and both end portions of the upper crossmember 55, respectively.

Figure 4:
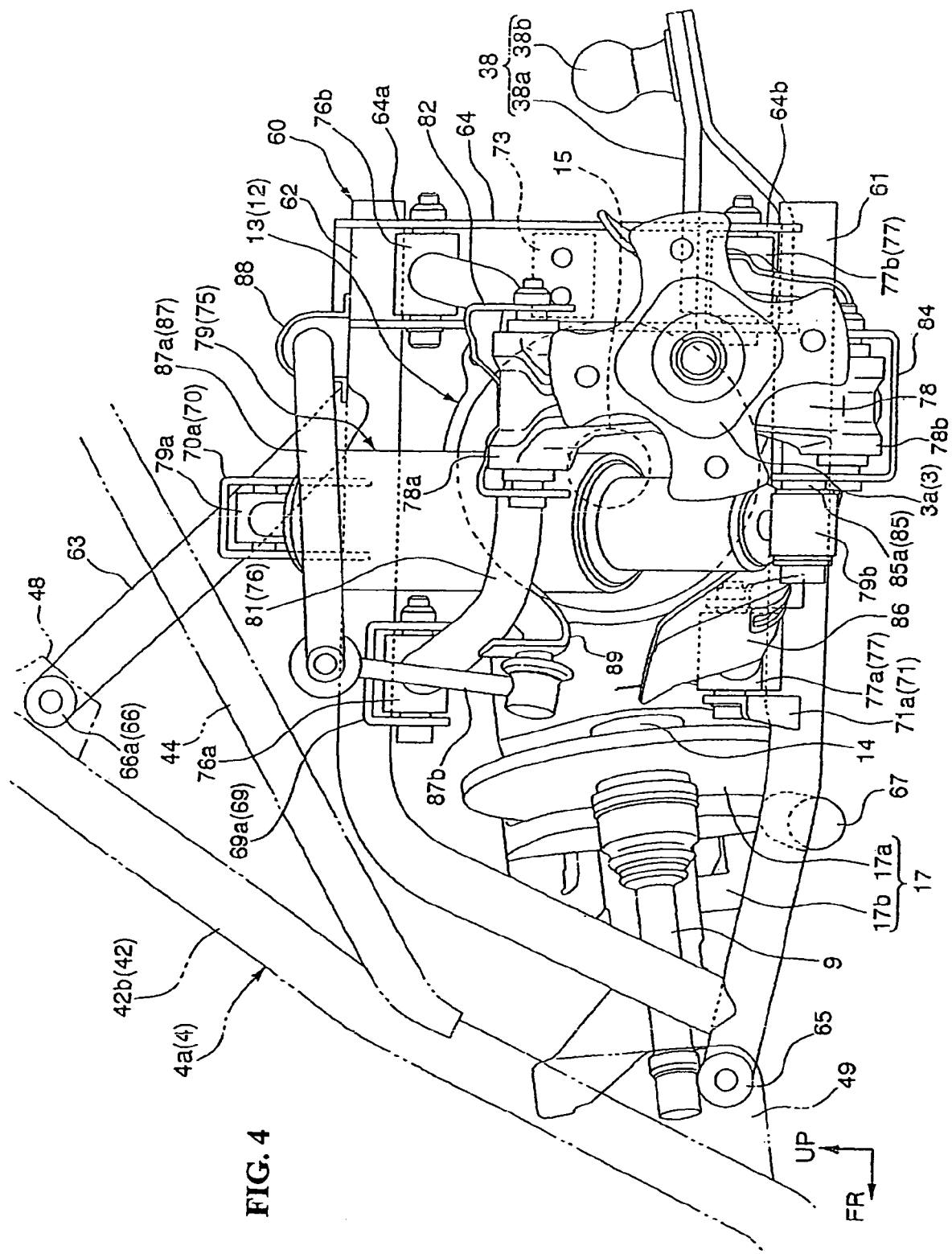
FIG. 4 is a detail side perspective view of a rear suspension portion of the saddle-type four-wheel all-terrain vehicle of FIGS. 1-2.

As shown in FIG. 4, a sub-frame 60 is formed by integrally joining plural tubular steel members by welding or the like, in a similar manner to the frame body 4*a*. To be more specific, the sub-frame 60 includes left and right sub-frame lower pipes 61 (only the left side is shown in FIG. 4) extending obliquely and slightly downwardly toward the rear from the lower frame-connecting boss 65. The sub-frame 60 also includes left and right sub-frame upper pipes 62 extending obliquely upward from the vicinity of the front end portion of both sub-frame lower pipes 61, and then being bent rearward substantially in parallel with the sub-frame lower pipes 61. The sub-frame 60 also includes left and right extension pipes 63 extending obliquely upwardly and toward the front from upper rear portions of both sub-frame upper pipes 62, and left and right rear bracket members 64, extending vertically between respective rear end portions of the sub-frame upper pipes 62 and the sub-frame lower pipes 61, to form a pair of left and right closed loop structural bodies. The sub-frame 60 is formed as a generally box-shaped structure, extending continuously to the rear portion of the frame body 4*a* at an intermediate portion in the vehicle width direction by joining these members with a plurality of crossmembers. Hereinafter, the left side of the sub-frame 60, as shown in FIG. 4, will be described unless otherwise specified, and redundant description on the right side of the sub-frame 60 will be omitted, since it is symmetrical to the left side.

Figure 5:
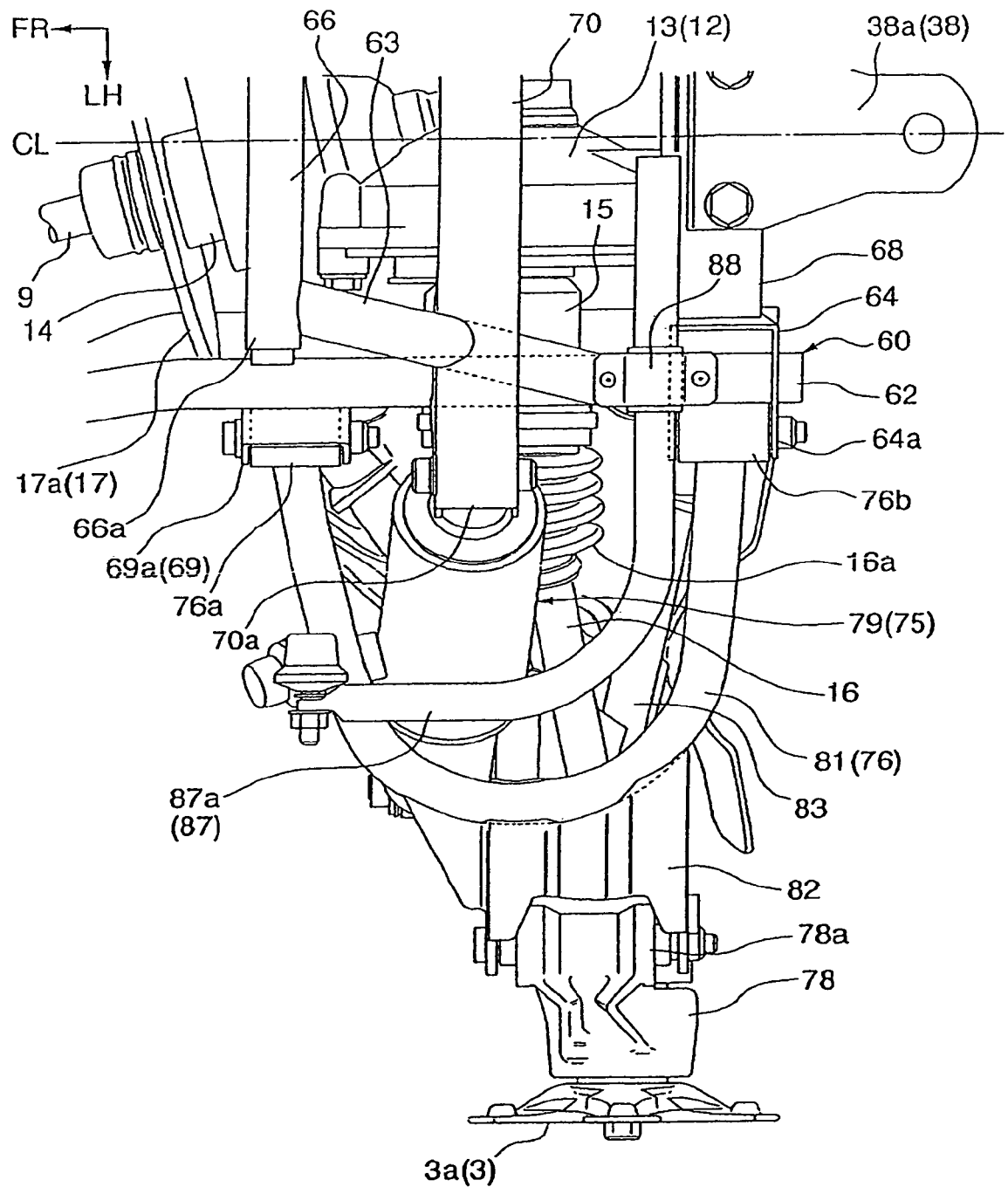
FIG. 5 is a top plan view of the rear suspension portion of FIG. 4.
Figure 6:
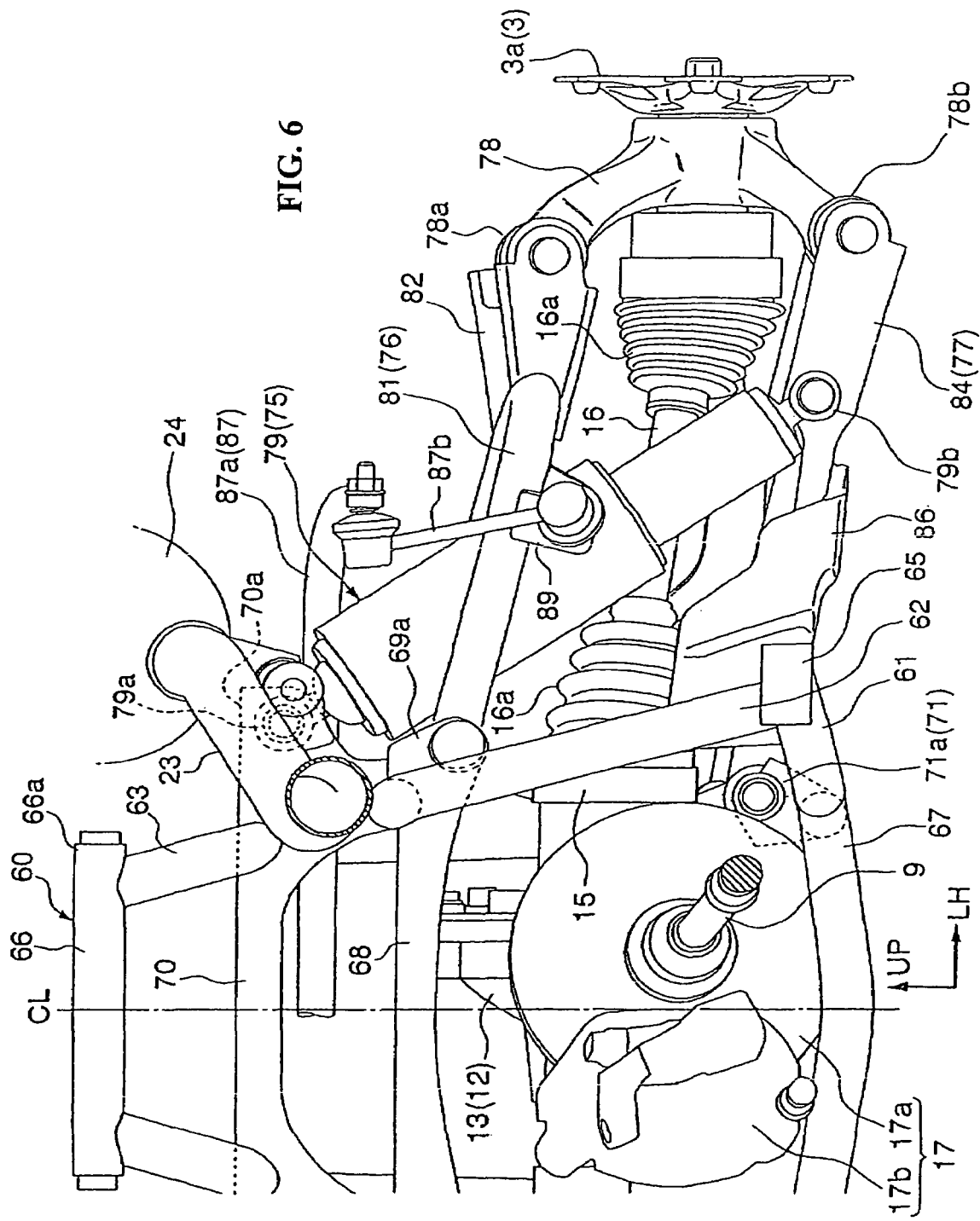
FIG. 6 is a front plan view of the rear suspension portion of FIGS. 4-5.
Figure 7:
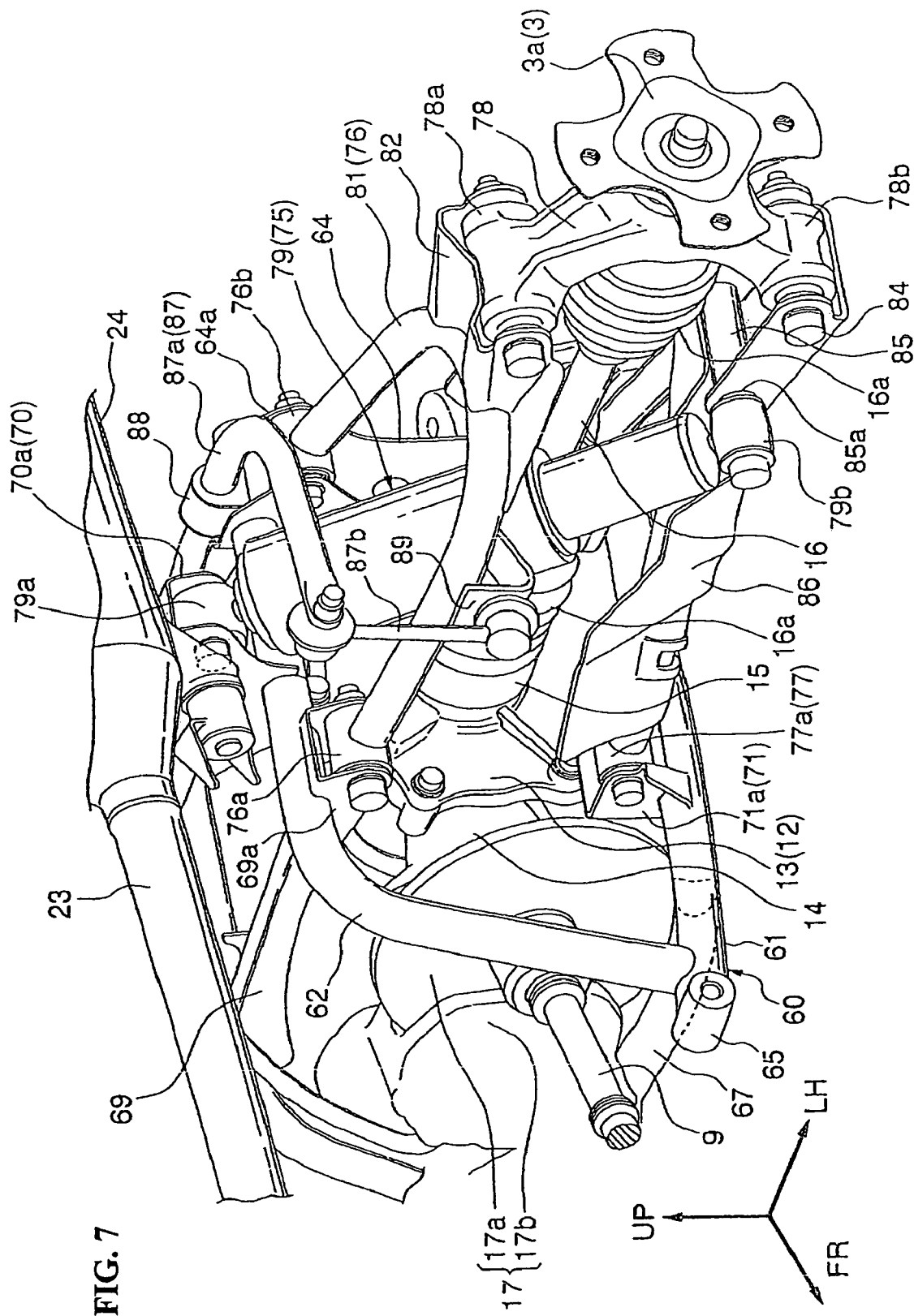
FIG. 7 is a front perspective view of the rear suspension portion of FIGS. 4-6.

Referring also to FIGS. 5 through 7, the sub-frame lower pipe 61 is formed out of a round steel pipe, and the short, cylindrical, lower frame-connecting boss 65 is joined to the front end portion of the sub-frame lower pipe 61 so as to extend along a lateral direction of the vehicle. The lower frame-connecting boss 65 is connected to the lower frame bracket 49 by way of a connecting shaft, such as a bolt extending in the lateral direction. A partially broken center line CL, in FIGS. 5 and 6, indicates the widthwise center of the vehicle body.

The sub-frame lower pipe 61 extends obliquely downward toward the rear, and laterally inward from the lower frame-connecting boss 65, and then bends at a longitudinally intermediate portion thereof and extends generally rearwardly along the longitudinal direction. The rear portion of the sub-frame lower pipe 61 is positioned at a position lower than a rear output portion 15 of the rear terminal gear case 12, and substantially at the same level as the lower end portion of a casing 13. The front end portion of the sub-frame upper pipe 62 is joined by welding to the upper surface of the front end portion of the sub-frame lower pipe 61, so as to be disposed immediately rearward of the lower frame-connecting boss 65.

The sub-frame upper pipe 62 is formed out of a round steel pipe having substantially the same diameter as the sub-frame lower pipe 61, and extends from the front end portion thereof (the joint portion with the sub-frame lower pipe 61) obliquely upward toward the rear and laterally inwardly and is bent at the longitudinally intermediate portion thereof toward the rear substantially along the longitudinal direction. The rear portion of the sub-frame upper pipe 62 is positioned upwardly of the rear output portion 15 of the rear terminal gear case 12 and slightly upwardly of the upper end portion of the casing 13. The lower end portion of the extension pipe 63 is joined to the upper-surface side of the rear portion of the sub-frame upper pipe 62 by welding. For the sake of convenience of illustration, the extension pipe 63 is omitted in FIG. 7.

The extension pipe 63 is formed out of a round steel pipe of the same diameter as the other respective pipes discussed above, and extends obliquely upwardly toward the front and laterally inwardly from the lower end portion thereof (the joint portion with respect to the sub-frame upper pipe). The upper end portion of the extension pipe 63 is integrally joined, by welding, to a side end portion of a laterally extending top crossmember 66. The top crossmember 66 is formed out of a round steel pipe of substantially the same diameter as the extension pipe 63, and the left and right extension pipes 63 are integrally joined to each other by way of the top crossmember 66 extending between the upper end portions thereof.

Figure 9:
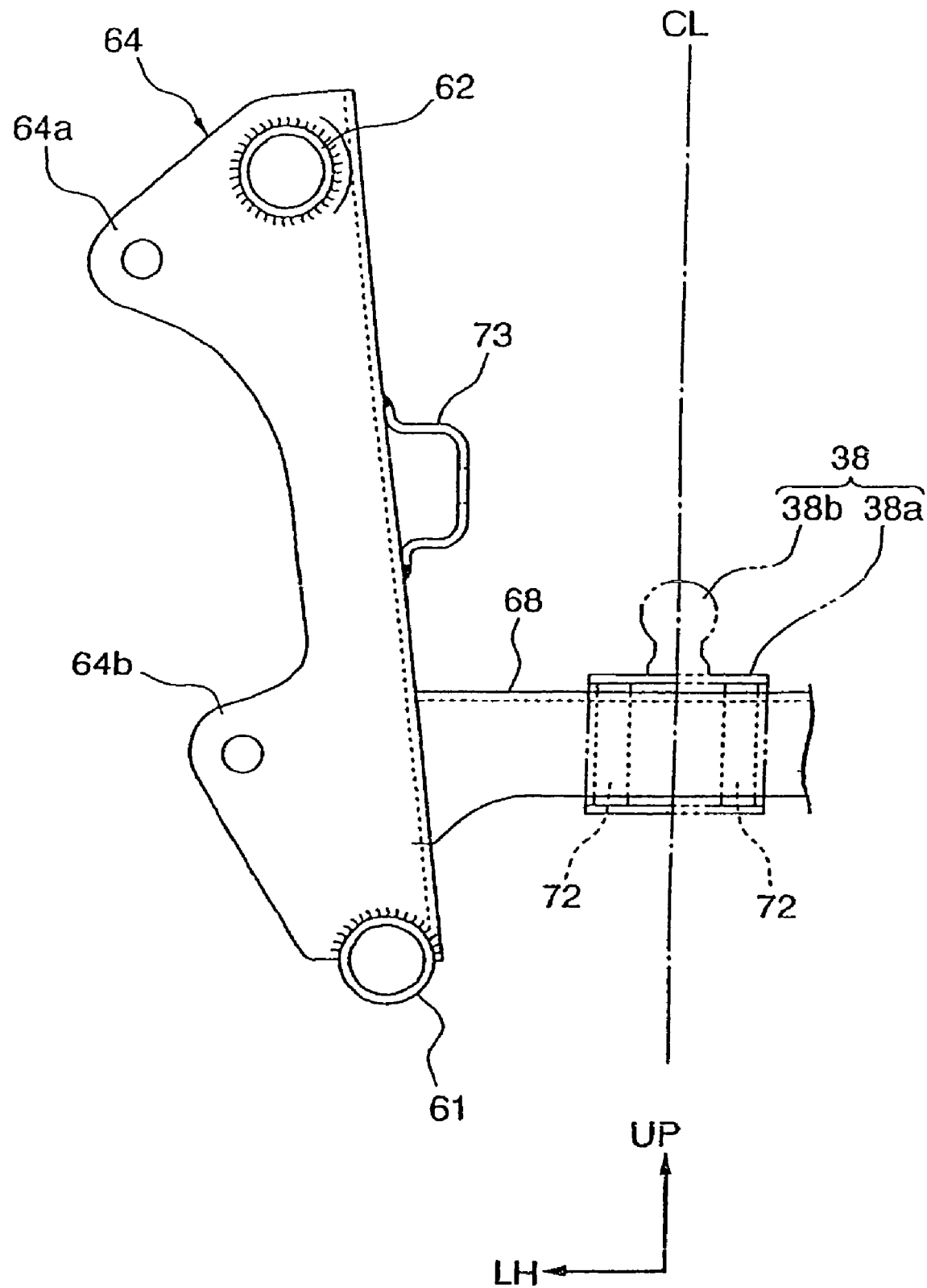
FIG. 9 is a rear plan view of a rear portion of a sub-frame portion of the vehicle body frame of FIG. 3.

Referring also to FIG. 9, the rear bracket member 64 is formed substantially in an angular C-shape in cross section, the C-shape opening toward the laterally outside direction. The rear bracket member 64 extends vertically, and the rear end portion of the sub-frame upper pipe 62 is fitted in the vicinity of the upper end portion of the rear bracket member 64 so as to penetrate therethrough and, in such a state, these members are joined to each other by welding. The lower end portions of the rear bracket member 64 are joined to each other by welding in a state that the lower end portion is aligned with the upper surface of the sub-frame lower pipe 61, which is arranged in the vicinity of the rear end portion of the sub-frame lower pipe 61. The sub-frame upper pipe 62 and the sub-frame lower pipe 61 are connected between the rear end portions thereof with respect to each other by the rear bracket member 64, and a closed loop structure as viewed in a side view of the sub-frame 60 is formed. It is also possible to employ a constitution in which these members are joined with each other by welding in a state that the lower end portion of the rear bracket member 64 is fitted to the sub-frame lower pipe 61 so as to penetrate therethrough.

In addition, a laterally extending front lower crossmember 67 extends between longitudinally intermediate portions of the left and right sub-frame lower pipes 61. In a similar manner, a rear lower crossmember 68 extends between the left and right rear bracket members 64 in the vicinity of the lower end portion thereof, a front upper crossmember 69 is extended between the left and right sub-frame upper pipes 62 in the vicinity of the longitudinally intermediate portions thereof, a upper central crossmember 70 extends between the left and right extension pipes 63 at the lower portions, and the top crossmember 66 extends between the left and right extension pipes 63 at the upper end portions thereof.

The front lower crossmember 67 is formed out of a round steel pipe of the same diameter as the sub-frame lower pipe 61, and is joined thereto by welding in a state that both end portions thereof match the inner surface of the sub-frame lower pipe 61. The front lower crossmember 67 is formed into a downwardly protruding curved shape, so as to ensure a distance with the rear propeller shaft 9 and peripheral parts thereof.

The rear lower crossmember 68 is formed substantially in an angular C-shape opened downward in cross section by bending a steel plate so as to extend laterally, and is joined to the rear bracket member 64 by welding in a state that both ends thereof match the inner surface of the rear bracket member 64. The rear lower crossmember 68 also serves as a mounting member for the trailer hitch 38. In other words, a pair of left and right mounting pipes 72 are respectively fixed to the rear lower crossmember 68 by welding so as to vertically penetrate the laterally intermediate portion, and the mount bracket 38*a* of the trailer hitch 38 is joined to both mount pipes 72 with bolts or the like. It is also possible to employ an alternative constitution in which the trailer hitch 38 is welded directly to the rear lower crossmember 68.

The front upper crossmember 69 is formed substantially in an angular C-shape opening downwardly in cross section, by bending a steel plate so as to extend laterally, and is joined to the sub-frame upper pipes 62 by welding. The front upper crossmember 69 and the sub-frame upper pipes 62 are aligned such that that notches formed on the upper side at of the upper crossmember 69, at both end portions thereof, match the respective lower surfaces of the sub-frame upper pipes 62.

The upper central crossmember 70 is formed substantially in an angular C-shape opening downwardly in cross section, by bending a steel plate so as to extend laterally, and is joined to the extension pipes 63 and the sub-frame upper pipes 62 by welding in a state that both end portions thereof match the inner surfaces of the extension pipes 63 and the sub-frame upper pipes 62 in a straddled manner.

The top crossmember 66 is formed of a round steel pipe of substantially the same diameter as the extension pipe 63, and is joined with both extension pipes 63 by welding in a state that the distal end portions of both extension pipes 63 match the lower surface at both end portions thereof. Here, the top crossmember 66 constitutes the upper frame connecting portion 66a by inserting nuts to both end portions thereof or the like, and the upper frame connecting portion 66a is connected and fixed to the upper frame bracket 48 by way of a connecting shaft such as a bolt or the like extending in the lateral direction.

Both end portions of the front upper crossmember 69 project outwardly beyond the sub-frame upper pipe 62 in the lateral direction, to form a front upper arm supporting portion 69a, and a front arm connecting boss 76a of an upper arm 76 of a rear suspension 75 is pivotally and swingably supported on the front upper arm supporting portion 69a by way of an upper front pivot shaft extending generally along the longitudinal direction. The upper outside of the rear bracket member 64 also projects outwardly of the sub-frame upper pipe 62 in the lateral direction to form a rear upper arm supporting portion 64a, and a rear arm connecting boss 76b of the upper arm 76 is pivotally and swingably supported by the rear upper arm supporting portion 64a by way of an upper rear pivot shaft which extends coaxially and substantially in line with the upper front pivot shaft, as shown.

A lower arm bracket 71, which is formed by bending a steel plate in a general cross-sectional C-shape, is joined, by welding, with a longitudinally intermediate portion of the sub-frame lower pipe 61. The lower arm bracket 71 projects outwardly of the sub-frame lower pipe 61 in the lateral direction to form a front lower arm supporting portion 71a, and a front arm connecting boss 77a of a lower arm 77 of the rear suspension 75 is swingably supported by the front lower arm supporting portion 71a by way of a lower front pivot shaft which extends in parallel with the upper pivot shafts. The lower outside of the rear bracket member 64 also projects outwardly of the sub-frame lower pipe 61 in the lateral direction, to form a rear lower arm supporting portion 64b, and a rear arm connecting boss 77b of the lower arm 77 is swingably supported by the rear lower arm supporting portion 64b by way of a lower rear pivot shaft which extends coaxially and substantially in line with the lower front pivot shaft.

Both end portions of the upper central crossmember 70 form upper shock absorber supporting portions 70a by projecting relatively significantly outwardly from the sub-frame upper pipe 62, and an upper end connecting boss 79a of a rear shock absorber 79 is swingably supported by the upper shock absorber supporting portion 70a, by way of a connecting shaft which extends in parallel with the respective pivot shafts. This connecting shaft may consist of a nut and bolt assembly. Both of the upper shock absorber supporting portions 70a are located relatively near an upper frame connecting portion 66a of the sub-frame 60, which is a mounting portion on the upper portion of the sub-frame 60, at the upper ends of the left and right extension pipes 63, with respect to the frame body 4a.

The front and rear of the left and right upper arms 76, on the proximal end sides of the rear suspensions 75, are supported, so as to be capable of reciprocally swinging in the vertical direction, by both end portions of the front upper crossmembers 69 and the upper outside portion of both rear bracket members 64 (the front and rear upper arm supporting portions 69a, 64a). The front and rear on the proximal end sides of the left and right lower arms 77 are also respectively supported, so as to be capable of reciprocally swinging in the vertical direction, by the outside portions of both lower arm brackets 71 and the lower outside portions of both rear bracket members 64 (the front and rear lower arm supporting portions 71a, 64b). The upper and lower portions of left and right knuckles 78 are swingably supported by the distal end sides of both upper arms 76 and lower arms 77, and hub portions 3a of the left and right rear wheels 3, respectively, are rotatably supported by the knuckles 78.

The left and right rear shock absorbers 79, respectively, are interposed between shock absorber supporting portions 85a of the lower arms 77 (see FIG. 8) and the end portions of the upper central crossmember 70 (the upper shock absorber supporting portions 70a).

The upper arm 76 is formed by bending, for example, a round steel pipe into a substantially U-shape, opening laterally inwardly in top view, to form an arm body 81. The short cylindrical arm connecting bosses 76a, 76b, which extend substantially in the longitudinal direction, are joined by welding to both end portions of the upper arm 76 on the opened side thereof, and an upper supporting bracket 82, formed by bending a steel plate, is welded on to an outer portion of the upper arm 76, such that the upper supporting bracket 82 is offset to the outside portion and displaced slightly rearwardly from the center of the arm.

The respective arm connecting bosses 76a, 76b of the upper arm are arranged in line and coaxially with respect to each other, and are connected so as to be pivotally swingable on the pivot shaft, and the respective arm connecting bosses 76a, 76b are respectively disposed between the front and rear walls of the front and rear upper arm supporting portions 69a, 64a of the sub-frame 60, respectively.

The upper supporting bracket 82 is formed substantially in an angular C-shape, opening downward in cross section, and projects laterally outwardly from the arm body 81 of the upper arm 76. The upper supporting bracket 82 is connected to the arm body 81 in a manner such that an upper connecting portion 78a of the knuckle 78 enters between the front and rear walls of the upper supporting bracket 82 by way of a connecting shaft which extends in parallel with the pivot shaft. This connecting shaft can also constitute a nut and bolt assembly.

Figure 8:
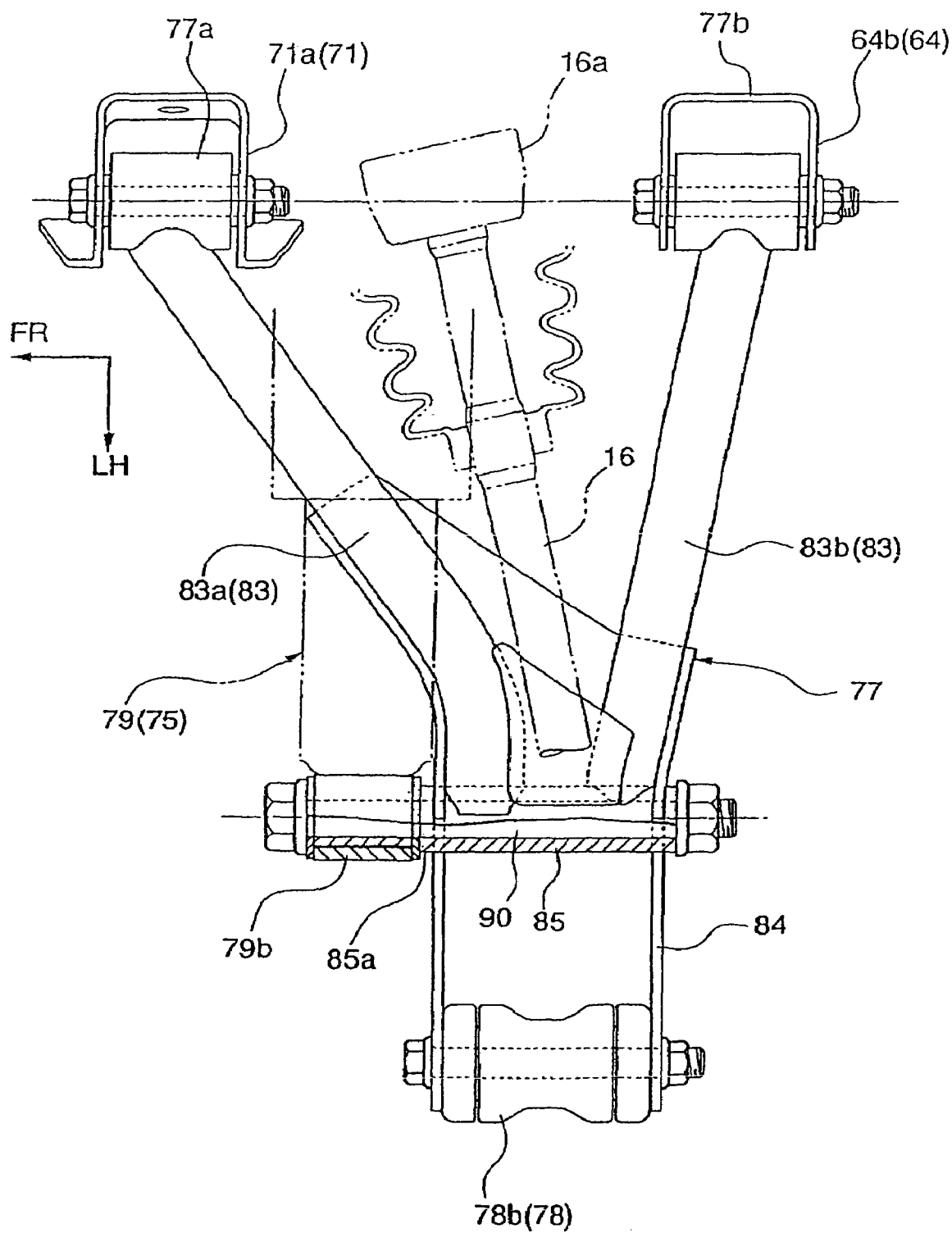
FIG. 8 is a top plan view of a lower arm which is one component of the rear suspension portion of FIGS. 4-7, where the lower arm is configured according to a first embodiment of the present invention.

Referring also to FIG. 8, the lower arm 77 includes for example, front and rear arm bodies 83a, 83b, formed of round steel pipes, which are arranged to form substantially a V-shaped opening which faces laterally inwardly in top view. The front and rear arm bodies 83a, 83b cooperate to constitute a (main) lower arm body 83 by integrally joining the outside portions thereof. The short cylindrical front and rear arm connecting bosses 77a, 77b, which extend in parallel with the arm connecting bosses 76a, 76b of the upper arm, are joined by welding to both end portions of the lower arm body 83 on the opened side thereof. The lower arm 77 also includes a lower supporting bracket 84, which is formed by bending a steel plate, and which is joined by welding to the outside of both end portions of the lower arm body 83.

The respective arm connecting bosses 77a, 77b are arranged coaxially and in line with one another, and are connected so as to be swingable on their respective pivot shafts, in a state that the respective arm connecting bosses 77a, 77b are disposed between the front and rear walls of the front and rear lower arm supporting portions 71a, 64b of the sub-frame 60, respectively.

The lower supporting bracket 84 is formed substantially in an angular C-shape, opening upwardly in cross section, and projects laterally outside, and is connected to an outer end of the lower arm body 83, in a state that a lower connecting portion 78b of the knuckle 78 enters between the front and rear walls of the lower supporting bracket 84 by way of a connecting shaft which extends in parallel with the pivot shafts of the arm connecting bosses 77a, 77b. This connecting shaft for the lower connecting portion of the knuckle 78 can also constitute a nut and bolt assembly.

As seen best in FIG. 8, the outside portion of the arm body 83 is displaced slightly rearwardly, and the front arm body 83a, inclined steeply with respect to the lateral direction, is bent so that the distal end side thereof extends substantially in parallel with the lateral direction thereof accordingly. The front and rear arm bodies 83a, 83b are integrally joined to a lower damper supporting pipe 85 by welding the distal end portions of the arm bodies to front and rear portions of the lower damper supporting pipe 85. The lower damper supporting pipe 85 is formed out of a round steel pipe extending in parallel with the pivot shafts of the arm connecting bosses 77a, 77b. The lower supporting bracket 84, in turn, is also mounted and joined by welding to the distal end sides of the front and rear arm bodies 83a, 83b so as to cover these members from below.

The lower damper supporting pipe 85 extends through, and is joined by welding to the lower supporting bracket 84, so as to penetrate the front and rear walls thereof. A lower end connecting boss 79b of the rear shock absorber 79 is positioned on, and coaxially surrounds the front-end side of the lower damper supporting pipe 85 (the front surface-side of the lower arm 77) at the area thereof outside and in front of the lower supporting bracket 84. In this way, the lower end of the rear shock is cantilevered in relation to the lower arm 77.

The lower end portion of the rear shock absorber is swingably connected to the lower damper supporting pipe 85 by way of a connecting shaft 90 which extends through the lower supporting pipe and through the lower connecting boss 79b of the shock absorber, in parallel with the pivot shaft. This connecting shaft 90 may also be provided in the form of a nut and bolt assembly. In other words, the lower damper supporting pipe 85 includes the lower shock absorber supporting portion 85a which supports the lower end connecting boss 79b of the rear shock absorber 79, together with the connecting shaft 90.

Here, since the lower supporting bracket 84, which corresponds to a knuckle supporting portion, is provided with the lower damper supporting pipe 85 as the damper connecting portion, and as a result, the lower end connecting boss 79b of the rear shock absorber 79 is positioned in the vicinity of a lower portion of the knuckle 78. The lower damper supporting pipe 85, which includes the lower shock absorber supporting portion 85a, is provided at a level substantially the same as an outer end portion of the lower arm 77 (in other words, a level (position) which does not protrude from the upper and lower surfaces of the lower arm 77 (the front and rear arm bodies 83a, 83b) or a level which is generally overlapped with the outer end of the lower arm 77 in front view).

An arm cover 86, formed of resin, for example, is mounted on the lower-surface side of the lower arm 77 so as to cover the lower arm 77 between the front and rear arm bodies 83a, 83b.

The upper arm 76 and the lower arm 77 are arranged so as to be inclined slightly with the distal end side positioned slightly downwardly in front view and substantially in parallel with each other (see FIG. 6). When an impact load or the like is supplied from a road surface to the left and right rear wheels 3, the respective rear wheels 3 and the knuckle 78 are displaced in the vertical direction, and the respective arms 76, 77 are swung in the vertical direction, so that the rear shock absorber 79 expands and contracts in association with the swinging motion. The load is gently absorbed by the damping action by expansion and contraction of the rear shock absorber 79.

A supporting bracket 73 is joined by welding to the vertically intermediate portion of the rear bracket member 64 on the left side of the sub-frame 60 (see FIG. 4 and FIG. 9), and the rear end portion of the casing 13 of the rear terminal gear case 12 is joined to and supported by the supporting bracket 73 with a bolt or the like. The rear terminal gear case 12 is arranged in the sub-frame 60 so as to be surrounded by the various pipes, a rear input portion 14 to which the rear propeller shaft 9 is connected is provided at the front end portion of the casing 13 thereof, and left and right rear output portions 15 to which left and right rear drive shafts 16 are connected are provided at both sides of the rear portion of the casing 13.

The rotational power of the rear propeller shaft 9 supplied to the rear input portion 14 is reduced in speed by a pair of bevel gears in the casing 13, is converted in direction of rotation, and is outputted to left and right output portions. The rear input portion 14 is located substantially at the lateral center of the vehicle body, the rear output portion of the engine 5 is offset to the left side of the vehicle body, and the rear input portion 14 is provided so as to incline in top view corresponding to the rear propeller shaft 9 which extends between the rear output portion and the rear input portion 14 of the rear terminal gear case 12.

The rear terminal gear case 12 is positioned forwardly and upwardly of the hub portions 3a of the rear wheels 3, and the left and right rear drive shafts 16 extending between both rear output portions 15 and the hub portion 3a are arranged so as to be inclined respectively in plan view, and are connected to the rear output portion 15 and the hub portion 3a by way of a universal joint 16a provided to both end portions thereof. Both rear drive shafts 16 are arranged obliquely so as to extend substantially in parallel with the respective arms 76, 77 in front view (FIG. 6).

The rotational power outputted to both rear output portions 15 is transmitted to the left and right rear wheels 3 by way of the left and right rear drive shafts 16, and drives the same to rotate. At immediately front of the rear input portion 14 of the rear terminal gear case 12, brake disks 17a for left and right rear wheel brakes 17 are coaxially fixed on the rear propeller shaft 9, and brake calipers 17b corresponding to the brake disks 17a are mounted inwardly of the front portion of the sub-frame 60.

The rear shock absorbers 79 are arranged obliquely so that the lower sides thereof are positioned laterally outside in front view, and are arranged substantially along the vertical direction as viewed in a side view. The upper end connecting boss 79a of the rear shock absorber 79 is connected so as to be capable of swinging by way of the connecting shaft in a state of being entered between the front and rear walls of the upper shock absorber supporting portion 70a. The upper shock absorber supporting portion 70a is positioned forwardly of the front end of the lower damper supporting pipe 85 of the lower arm 77, and the lower end connecting boss 79b of the rear shock absorber 79, located downwardly of the upper shock absorber supporting portion 70a, is arranged so that the rear end surface thereof opposes the front end surface of the lower shock absorber supporting portion 85a of the lower damper supporting pipe 85 of the lower arm 77 (FIG. 8).

The rear shock absorber 79 penetrates the inner side of the upper arm 76 through the vertical direction, and is positioned in front of the rear drive shaft 16. The lower end connecting boss 79b of the rear shock absorber 79 is connected to the outside (front surface side) of the lower arm 77 in the vicinity of the knuckle 78.

The lower end connecting boss 79b of the rear shock absorber 79 is supported in a cantilevered manner on the front-surface side of the lower arm 77 by way of the connecting shaft 90 (such as an elongated bolt) which axially penetrates the lower end connecting boss 79b in the longitudinal direction together with the lower damper supporting pipe 85. Accordingly, the mounting and dismounting of the rear shock absorber 79 with respect to the lower arm 77 can be facilitated, and the mass of the vehicle body can be concentrated since the rear shock absorber 79 is positioned forwardly of the hub portions 3a of the rear wheels 3 (close to an intermediate portion of the vehicle body in the longitudinal direction). The supporting rigidity of the rear shock absorber 79 is increased by the lower end connecting boss 79b thereof being connected to the lower damper supporting pipe 85 which penetrates the lower arm 77 across the front and rear arm bodies 83a, 83b. It is also possible to employ a constitution in which the lower end connecting boss 79b of the rear shock absorber 79 is supported at both end portions thereof at the front and rear.

The rear drive shaft 16 is positioned overlying the lower arm 77, and a sufficient distance is ensured between the rear shock absorber 79 and the rear drive shaft 16 by arranging the rear shock absorber 79 forwardly of the lower arm 77. Therefore, the limit in layout of the rear shock absorber 79 with respect to the rear drive shaft 16 and the universal joint 16a is alleviated and hence, the position of the lower end of the rear shock absorber 79 can be moved to laterally outsides, that is, in the vicinity of the knuckle 78, so that a large shock absorber stroke of the rear suspension 75 can be ensured and the flexibility in design of shock absorber characteristics can be increased.

The rear suspension 75 here is provided with a stabilizer 87 for restraining the behavior of the left and right rear wheels 3 in order to restrain the difference in vertical movement therebetween. The stabilizer 87 includes a torsion bar 87a formed substantially in an angular C-shape in top view, and connecting rods 87b extending between both opened ends of the torsion bar 87a and the upper arm 76. The torsion bar 87a extends laterally above the rear portion of both sub-frame upper pipes 62, and both side portions thereof are bent forward on the left and right outsides of the rear shock absorber 79, whereby both sides of the rear side portion of the torsion bar 87a are rotatably supported on both sub-frame upper pipes 62 by way of a holder 88 (FIG. 7).

The upper end portions of the connecting rods 87b are swingably connected to both end portions of the torsion bar 87a by way of ball joints and the lower end portions of the connecting rods 87b are swingably connected to connecting brackets 89 projecting downward from the outsides of the front portion of the upper arm 76 by way of the ball joints. Accordingly, when one of the rear wheels 3 is moved in the vertical direction, a torsion stress of the torsion bar 87a acts to cause the same vertical movement to the other rear wheel 3.

When manufacturing the sub-frame 60, the left and right sub-frame upper pipes 62 and the front upper crossmember 69 are integrally joined by welding, and the left and right sub-frame lower pipes 61 and the front lower crossmember 67 are integrally joined by welding. The lower frame connecting portions 65 are sub-assembled by welding in advance to the front ends of both sub-frame lower pipes 61.

The left and right extension pipes 63 and the top crossmember 66 are integrally joined by welding, and the left and right rear bracket members 64 and the rear lower crossmember 68 are integrally joined by welding. The supporting bracket 73 for the rear terminal gear case 12 is sub-assembled to the rear bracket member 64 by welding in advance, and the mount pipe 72 for the trailer hitch 38 is sub-assembled to the rear lower crossmember 68 by welding in advance.

After having assembled and joined the above-mentioned assemblies by welding, the upper central crossmember 70 is joined by welding, and the left and right lower arm brackets 71 are joined by welding whereby an integral sub-frame 60 is formed. It is also possible to assemble the sub-frame 60 in a state that the trailer hitch 38 is assembled to the rear lower crossmember 68 in advance.

In this manner, by the provision of the arm supporting portions 64a, 64b of the rear suspension 75 on the upper and lower portions of the rear bracket member 64 as a frame member of the sub-frame 60, the members which require the rigidity are formed integrally in the rear bracket member 64 of substantially into an angular C-shape in cross section, and the relative positional accuracy is increased in comparison with the case in which the upper and lower arm supporting portions 64a, 64b are formed as separate members.

As described above, the suspension structure in the embodiment shown above is such that the rear suspensions 75 for suspending the left and right rear wheels 3 each include the lower arm 77 for supporting the rear wheel 3 by way of the knuckle 78, the rear shock absorber 79 interposed between the lower arm 77 and the vehicle body frame 4 (sub-frame 60), and the rear drive shaft 16 for transmitting a power to the rear wheel 3, and the lower end connecting boss 79b of the rear shock absorber 79 is cantilevered on the front-surface side of the lower arm 77.

In this arrangement, the lower end connecting boss 79b of the rear shock absorber 79 can easily be mounted and demounted from the front of the lower arm 77 and hence, ease of assembly and maintainability of the rear shock absorber can be improved. In addition, the lower end connecting boss 79b of the rear shock absorber 79 can be arranged in the vicinity of the knuckle 78 while restraining the influence of the layout with respect to the rear drive shaft 16. In particular, by connecting the lower end connecting boss 79b of the rear shock absorber 79 to the front-surface side of the lower arm 77 in cantilevered fashion, the rear shock absorber 79 is located in the vicinity of the center of the vehicle body and hence, the mass of the vehicle body can be concentrated.

In the suspension structure in the embodiment shown above, a large shock absorber stroke of the rear suspension 75 can be ensured without moving the upper end supporting position of the rear shock absorber 79 upward (inside the sub-frame 60) by arranging the lower end connecting boss 79b of the rear shock absorber 79 in the vicinity of the knuckle 78.

Furthermore, in the suspension structure in the embodiment shown above, the lower arm 77 is formed including the front and rear arm bodies 83a, 83b assembled integrally, and the lower end connecting boss 79b of the rear shock absorber 79 is supported by the lower damper supporting pipe 85 integrally joined to the front and rear arm bodies 83a, 83b, so that the supporting rigidity of the lower end connecting boss 79*b* of the rear shock absorber 79 is increased, whereby the rigidity of the rear suspension 75 can be increased.

In addition, in the suspension device in the embodiment shown above, the rear shock absorber 79 can be arranged at a distance in the direction of height as well by arranging the rear shock absorber 79 so as to overlap the lower arm 77 in the direction of height and hence, a large shock absorber stroke can be ensured. In particular, since the lower end connecting boss 79*b* of the rear shock absorber 79 is arranged so as to be substantially the same level as the outside portion of the lower arm 77, a large shock absorber stroke of the rear suspension 75 can be ensured without affecting the minimum ground clearance of the vehicle by the lower end connecting boss 79*b* of the rear shock absorber 79.

Further, in the suspension device in the embodiment shown above, the lower end connecting boss 79*b* of the rear shock absorber 79 is supported on the lower damper supporting pipe 85 by way of the connecting shaft 90 which penetrates the lower damper supporting pipe 85 in the axial direction thereof and hence, a cantilever load of the lower end connecting boss 79*b* of the rear shock absorber 79 can be supported on all of the lower damper supporting pipe 85, thus further increasing the supporting rigidity of the lower end connecting boss 79*b* of the rear shock absorber 79.

Figure 10:
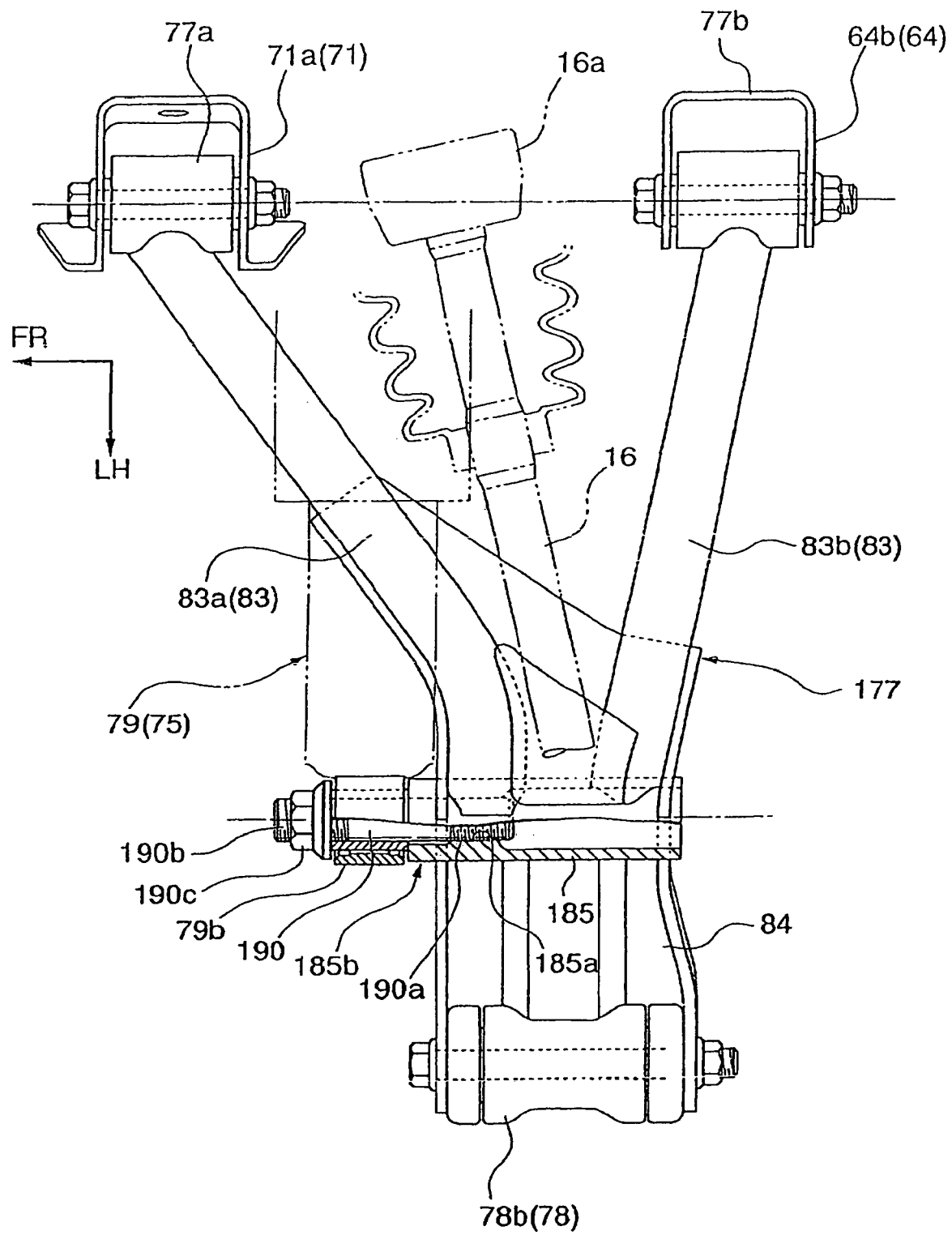
FIG. 10 is a top plan view, corresponding to FIG. 8, of a lower arm according to a second embodiment of the present invention.

Next, a second embodiment of the invention is explained in conjunction with FIG. 10.

In this embodiment, a point which substantially makes this embodiment differ from the above-mentioned first embodiment lies in that a lower arm 177 is adopted in place of the lower arm 77. Here, parts identical with the parts shown in the first embodiment are given the same symbols and their redundant explanation is omitted.

The lower arm 177 includes a lower damper supporting pipe 185 in place of the lower damper supporting pipe 85. The lower damper supporting pipe 185 has a diameter of an inner periphery of a front portion thereof narrowed and forms a threaded hole 185*a* in the narrow-diameter portion. In the threaded hole 185*a*, a proximal-end-side male threaded portion 190*a* of a stud shaft 190 which constitutes a connecting shaft of the lower end connecting boss 79*b* of the rear shock absorber 79 is threadably engaged and fixed. Accordingly, on the front-end side of the lower damper supporting pipe 185, a lower shock absorber supporting portion 185*b*, on which the stud shaft 190 is fixedly mounted, is constituted. Here, the stud shaft 190 may be fixed to the lower damper supporting pipe 185 by welding, rivets, caulking, adhesion or the like and may be integrally formed with the lower damper supporting pipe 185.

The stud shaft 190 penetrates the lower end connecting boss 79*b* of the rear shock absorber 79. While holding such a shaft penetrating state, a nut 190*c* is threadably engaged with a distal-end-side male threaded portion 190*b* of the stud shaft 190 so as to fasten the lower end connecting boss 79*b* and hence, the mounting of the lower end connecting boss 79*b* to the lower shock absorber supporting portion 185*b* is completed whereby the lower end connecting boss 79*b* of the rear shock absorber 79 is supported in a cantilevered manner on the front-surface side of the lower arm 177 by way of the stud shaft 190.

As has been explained heretofore, according to the above-mentioned second embodiment, on the lower damper supporting pipe 185 of the lower arm 177 of the rear suspension 75 which supports the lower end connecting boss 79*b* of the rear shock absorber 79, the stud shaft 190 which supports the lower end connecting boss 79*b* by penetrating the lower end connecting boss 79*b* is fixedly mounted and hence, the rear shock absorber 79 and the lower arm 177 can be easily assembled to each other and the supporting rigidity of the lower end connecting boss 79*b* of the rear shock absorber 79 can be further increased compared to a case that the lower end connecting boss 79*b* of the rear shock absorber 79 is supported using a connecting shaft such as a bolt which is formed as a separate member.

The invention is not limited to the embodiment described above and, for example, the lower end connecting boss 79*b* of the rear shock absorber 79 may be configured to be connected to the outer surface of the lower arm 77 such as the rear surface side or the left and right side surfaces of the lower arm 77. Here, the shock absorber supporting portion in the lower arm 77 may be configured such that the shock absorber supporting portion is formed in the outside of the lower arm 77 in a shape of a notch. Alternatively, it may possible to adopt a constitution in which the lower end connecting boss 79*b* of the rear shock absorber 79 is positioned at a level lower than the lower arm 77 and is connected to the lower arm 77 and hence, the rear shock absorber 79 per se is overlapped to the lower arm 77 in the direction of height.

It is also possible to apply the constitution of the present invention to a configuration in which the rear shock absorber 79 is interposed between the vehicle body frame 4 and the upper arm 76.

In addition, it is also possible to apply the constitution of the present invention to the front suspension 57. In this case, a constitution in which a member extends between the upper and lower frame members in the front portion of the vehicle body frame 4, and the member may support the front terminal gear case 11 or the front protector 34 (carry pipe) which constitutes the accessory part of the vehicle body.

The vehicle body frame 4 may have the integral structure or may be configured such that the engine 5 is used as a part of the vehicle body frame 4 or the sub-frame is connected to the engine 5.

The constitutions in the embodiment described above are provided only for an illustrative purpose, and are not limited to the application to the saddle-type four-wheel all-terrain vehicle as a matter of course. It is needless to say that various modifications may be made without departing from the scope of the invention.

What is claimed is:

1. A wheel suspension structure for a vehicle, the vehicle comprising
 a vehicle body frame,
 left and right wheels, and
 a power transmission shaft for transmitting power to the wheels,
 the wheel suspension structure provided for suspending one of the wheels and comprising:
  a suspension arm for supporting said one of the wheels, said suspension arm comprising a main arm body and a damper-supporting member integrally connected to the main arm body,
  a damper interposed between a portion of the suspension arm and the vehicle body frame, and
  a knuckle interposed between the suspension arm and said one of the wheels,
 wherein said damper comprises a connecting boss portion which operatively connects the damper to the suspension arm,
 wherein the damper-supporting member comprises a damper-supporting portion configured to fit inside of the connecting boss portion of the damper, wherein the connecting boss portion of the damper receives the damper-supporting portion of the damper-supporting member therein,
and wherein said connecting boss portion is disposed outside of and adjacent to a single outer edge portion of, and is operatively connected to the main arm body of the suspension arm, wherein the connecting boss portion of the damper is supported on the damper-supporting portion by way of a connecting shaft which penetrates the damper supporting portion in an axial direction.

2. A wheel suspension structure according to claim 1, wherein the connecting boss portion of the damper is operatively connected to a forward facing outer surface of the suspension arm.

3. A suspension wheel suspension according to claim 1, wherein the connecting boss portion of the damper is arranged proximate the knuckle.

4. A wheel suspension structure according to claim 1, wherein the main arm body of the suspension arm further comprises front and rear arm bodies integrally assembled together,
wherein the damper-supporting portion is disposed outside of the front and rear arm bodies,
wherein the connecting boss portion of the damper is supported by the damper-supporting portion of the suspension arm,
and wherein the damper-supporting portion is integrally connected to the front and rear arm bodies.

5. A wheel suspension structure according to claim 1, wherein a portion of the damper overlaps the suspension arm in a vertical direction.

6. A wheel suspension structure according to claim 1, further comprising a stud shaft which supports the connecting boss portion of the damper, and wherein the stud shaft is fixedly mounted on the damper-supporting portion.

7. A wheel suspension structure for a vehicle, the vehicle comprising
a vehicle body frame,
left and right wheels, and
a power transmission shaft for transmitting power to the wheels,
the wheel suspension structure provided for suspending one of the wheels and comprising:
a first suspension arm for supporting one of said wheels, the first suspension arm comprising a front arm body and a rear arm body arranged in a substantially V-shaped configuration,
a damper interposed between the first suspension arm and the vehicle body frame,
a knuckle disposed between the first suspension arm and the one of said wheels, and
a damper-supporting pipe, the damper-supporting pipe integrally attached to and extending through a portion of the first suspension arm proximate an apex of the substantially V-shaped configuration so as to project outwardly therefrom and define a projecting damper-supporting portion situated outside and forward of the first suspension arm,
wherein said damper comprises a connecting boss portion which operatively connects the damper to the first suspension arm, and wherein said connecting boss portion is disposed adjacent to and outside of a forward facing surface of the front arm body, and is operatively attached to the first suspension arm,
and wherein the connecting boss portion of the damper receives the damper-supporting portion therein, and is pivotally movable about the damper-supporting portion of the damper-supporting pipe, wherein the damper-supporting pipe comprises an interior threaded surface, and the wheel suspension structure further comprises a stud shaft adapted to fix the connecting boss portion to the first suspension arm, the stud shaft comprising an exterior surface including a threaded portion, the stud shaft extending through an interior passage of the damper connecting boss portion such that the threaded portion of the stud shaft engages the interior threaded surface of the damper-supporting pipe.

8. The wheel suspension structure of claim 7, further comprising an elongated bolt fixing the connecting boss portion of the damper to the first suspension arm, the elongated bolt extending through both the damper-supporting pipe and an interior passage of the connecting boss portion.

9. A wheel suspension structure for a vehicle, the vehicle comprising:
a vehicle body frame,
left and right wheels, and
a power transmission shaft for transmitting power to the wheels,
the wheel suspension structure provided for suspending one of said wheels and comprising:
a lower suspension arm for supporting one of said wheels, the lower suspension arm comprising a main arm body comprising a front member and a rear member arranged in a substantially V-shaped configuration,
an upper suspension arm disposed above the lower suspension arm and formed in a substantially U shaped configuration including two leg members joined by a base,
a damper extending between a portion of the lower suspension arm and the vehicle body frame,
a knuckle disposed between the one of said wheels and the lower and upper suspension arms, the knuckle comprising an upper connecting portion and a lower connecting portion, and
wherein said damper comprises a connecting boss portion which operatively connects the damper to the lower suspension arm,
a damper-supporting pipe which is integrally attached to and penetrates a portion of the lower suspension arm and which projects outwardly therefrom and defines a projecting damper-supporting portion situated outside and forward of the lower suspension arm, wherein:
the connecting boss portion of the damper receives the projecting damper-supporting portion of the damper-supporting pipe therein,
wherein the damper-supporting pipe comprises an interior threaded surface, and the wheel suspension structure further comprises a stud shaft adapted to fix the damper connecting boss portion to the lower suspension arm, the stud shaft comprising an exterior surface including a threaded portion, the stud shaft extending through an interior passage of the connecting boss portion such that the threaded portion of the stud shaft engages the interior threaded surface of the damper-supporting pipe,
the lower suspension arm extends between the vehicle body frame and the lower connecting portion of the knuckle,
the upper suspension arm extends between the vehicle body frame and the upper connecting portion of the knuckle,
the damper is arranged such that a lower end thereof is operatively connected to a forward facing surface of the front member of the lower suspension arm proximate an apex of the V-shaped configuration, and an intermediate portion of the damper passes between the leg members of the upper suspension arm;

the lower end of the damper is disposed adjacent to, forward of and outside of a forward-facing surface of the front member of the lower suspension arm, and is operatively connected to the lower suspension arm by the damper-supporting pipe.

10. A wheel suspension structure according to claim 1, wherein the vehicle body frame comprises a sub-frame cage, and wherein the suspension arm is pivotally attached to the sub-frame cage.

11. A wheel suspension structure according to claim 7, wherein the vehicle body frame comprises a sub-frame cage, and wherein the first suspension arm is pivotally attached to the sub-frame cage.

12. A wheel suspension structure according to claim 9, wherein the vehicle body frame comprises a sub-frame cage, and wherein the upper suspension arm is pivotally attached to the sub-frame cage.

13. The wheel suspension structure according to claim 1, further comprising a lower support bracket which is affixed to the main arm body and which has a substantially C-shaped cross-section opening upwardly and having front and rear walls;

wherein the damper-supporting member comprises a damper-supporting pipe extending through and affixed to the lower support bracket, with a forward portion of said damper-supporting pipe disposed outside of said lower support bracket and defining said damper-supporting portion;

and wherein said connecting boss portion of said damper is positioned on and coaxially surrounds said damper-supporting portion.

14. The wheel suspension structure according to claim 7, further comprising a lower support bracket which is affixed to the first suspension arm body and which has a substantially C-shaped cross-section opening upwardly and having front and rear walls;

wherein the damper-supporting pipe extends through and is affixed to the lower support bracket, with a forward portion of said damper-supporting pipe disposed outside of said lower support bracket and defining said damper-supporting portion;

and wherein said connecting boss portion of said damper is positioned on and coaxially surrounds said damper-supporting portion.

15. A wheel suspension structure according to claim 9, further comprising a lower support bracket which is affixed to the main arm body and which has a substantially C-shaped cross-section opening upwardly and having front and rear walls;

wherein the damper-supporting pipe extends through and is affixed to the lower support bracket, with a forward portion of said damper-supporting pipe disposed outside of said lower support bracket and defining said damper-supporting portion;

and wherein said connecting boss portion of said damper is positioned on and coaxially surrounds said damper-supporting portion.

\* \* \* \* \*